United States Patent
Braun et al.

(10) Patent No.: US 8,095,619 B2
(45) Date of Patent: Jan. 10, 2012

(54) AUTOMATION SYSTEM AND METHOD FOR OPERATING SUCH AN AUTOMATION SYSTEM

(75) Inventors: Ulrich Braun, Nürnberg (DE); Michael Göck, Fürth (DE); Ralf Leins, Ispringen (DE); Stefan Nitzsche, Frankenthal (DE); Oliver Thurau, Limburgerhof (DE)

(73) Assignee: Siemens Aktiengesellschaft, Munich (DE)

( * ) Notice: Subject to any disclaimer, the term of this patent is extended or adjusted under 35 U.S.C. 154(b) by 364 days.

(21) Appl. No.: 12/378,575

(22) Filed: Feb. 17, 2009

(65) Prior Publication Data
US 2009/0222106 A1   Sep. 3, 2009

(30) Foreign Application Priority Data
Feb. 18, 2008 (EP) ..................... 08002958

(51) Int. Cl.
*G06F 15/167* (2006.01)
*G06F 15/16* (2006.01)

(52) U.S. Cl. .................. 709/213; 709/201; 709/217

(58) Field of Classification Search ............... None
See application file for complete search history.

(56) References Cited

U.S. PATENT DOCUMENTS

| 6,701,345 | B1 * | 3/2004 | Carley et al. ............ 709/205 |
| 6,704,737 | B1 * | 3/2004 | Nixon et al. ............. 707/656 |
| 7,139,999 | B2 * | 11/2006 | Bowman-Amuah ...... 717/101 |
| 2003/0061349 | A1 | 3/2003 | Lo et al. |
| 2004/0181297 | A1 * | 9/2004 | Chambers et al. .......... 700/31 |
| 2005/0213763 | A1 * | 9/2005 | Owen et al. ............. 380/270 |

OTHER PUBLICATIONS

Dalrymple III P. W: "Maintaining File Security and Integrity Via PDS System", Jun. 1, 1995, pp. 69-75, vol. 68, Nr. 6, XP000522565, Control Solutions, Penwell Publishing, Tulsa; OK, US.

* cited by examiner

*Primary Examiner* — Yasin Barqadle

(57) ABSTRACT

An automation system with a plurality of communicatively connected automation devices is disclosed. One of the connected automations devices serves as a domain controller and holds centrally in a memory data required for operation for the automation system and the automation devices. Hitherto frequently occurring multiple storage of such data is eliminated, the data is available at a central location for access by all the automation devices, and the domain controller, as a central data server, ensures consistency of the data administered and provided by it, which also permits access optimizations, such as e.g. device-, access- or structure-dependent temporary storage strategies.

9 Claims, 6 Drawing Sheets

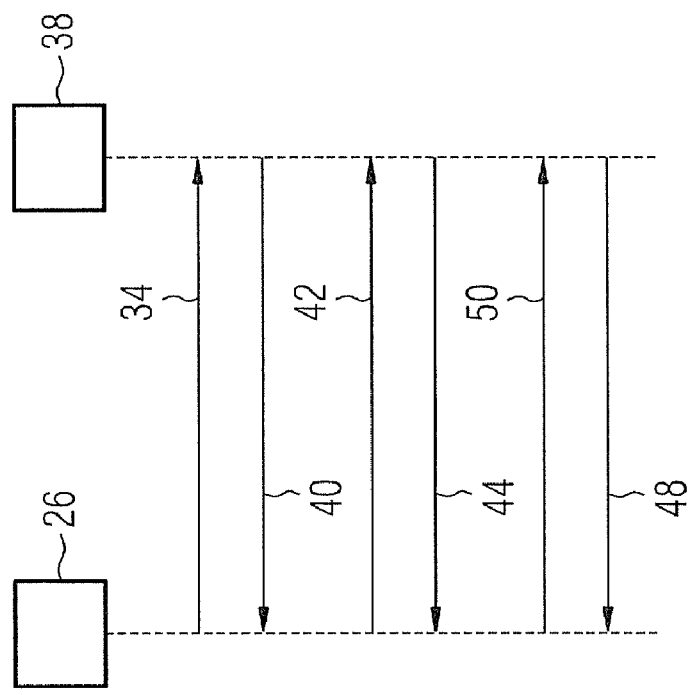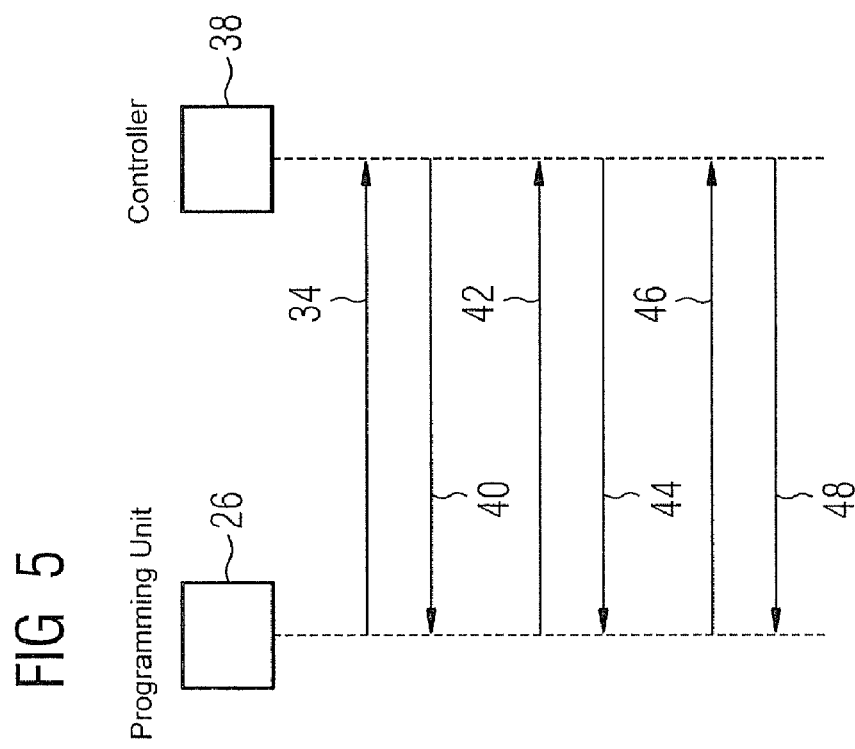
FIG 5

AUTOMATION SYSTEM AND METHOD FOR OPERATING SUCH AN AUTOMATION SYSTEM

CROSS REFERENCE TO RELATED APPLICATIONS

This application claims priority of European Patent Office application No. 08002958.0 EP filed Feb. 18, 2008, which is incorporated by reference herein in its entirety.

FIELD OF INVENTION

The invention relates to an automation system with a plurality of communicatively connected automation devices, and a method for operating an automation system of this kind.

Automation systems and automation devices incorporated therein are known per se. The applicant supplies e.g. automation devices known under the SIMATIC brand name, but also complete automation solutions, i.e. automation systems comprising automation devices of this kind, for controlling and/or monitoring a technical process.

BACKGROUND OF INVENTION

As already mentioned in DE 197 40 550, a programmable logic controller and a programming unit for creating a control program for a programmable logic controller of this kind are disclosed as automation devices in the Siemens Catalog ST 70, 1996 edition, Sections 3, 4 and 8. Important components of this programmable logic controller are modules for central tasks (CPU units) as well as signal, function and communication modules. During control operation, the CPU unit of the programmable logic controller cyclically executes a control program which a programmer creates using a programming unit provided with a software tool and which is designed to solve an automation task. During cyclical processing, the CPU first reads the signal statuses at all the physical process inputs and generates a process input image. Execution of the control program continues step by step, taking internal counters, flags and times into account, and finally the CPU unit stores the calculated signal statuses in the process output image from which these signal statuses are fed to the physical process outputs. A control program usually comprises software function blocks which enable the signal and/or function and/or communication modules to be operated. One of these function modules in the form of an NC control module can be used to control the technological sequence of motions of a production machine. For this purpose the CPU unit, which usually implements process control functionalities, transmits parameters to this NC control module, e.g. parameters in the form of start/stop coordinates of the production machine's drive axles to be controlled. In addition, the CPU unit selects process programs executable on the NC control module which are executed by a processor of the NC control module for controlling the sequence of motions of a production machine.

SUMMARY OF INVENTION

The term "automation device" for the overall context of this description must generally be construed as encompassing all devices, equipment or systems, i.e. not only e.g. controllers such as programmable logic controllers, process computers, (industrial) computers and the like but also individual controls, frequency converters and similar, of the kind that are used or can be used for open-loop control, closed-loop control and/or monitoring of technical processes e.g. for transforming or transporting material, energy or information, etc., wherein in particular energy is employed or converted via suitable technical means such as e.g. sensors or actuators.

As an example of a category of technical processes to be controlled or monitored, large-scale plants today consist of individual, distributed projects which can also be thought of as sub-processes, but whose data is of interest for operations in the plant as a whole or in the relevant company. This includes not only data of any kind, but also particularly configuration and runtime data which is distributed across the different automation devices and also in some cases stored in a multiply redundant manner. This results in a large storage requirement and unnecessary data transfers, the latter in turn disadvantageously reducing the availability of the devices involved. In addition, a large amount of configuration data about several projects in a plant, but also about several plants in a company or group of companies, is the same or overlapping to a large extent (e.g. user administration, plant maintenance, etc.). This results in multiple configuration of identical data and/or requires synchronization between the projects or systems which use this data. Distributing and duplicating the configuration and runtime data to a large number of devices and the associated data transfers (particularly copy and move operations) is a constant source of inconsistencies which can only be eliminated by re-providing the data, which, however, involves an increased network load for the automation system as a whole and at least temporary non-availability for the or each device affected. The above mentioned disadvantages also result in a considerable storage requirement, which in the case of complex automation systems or devices may extend into the GB range, heavy network loading at certain points and excessively high to unacceptable losses of availability e.g. for retrieving configuration data or synchronizing runtime data between devices.

If there is a simple central data repository for the configuration and runtime data, problems arise such as lengthy loading times (e.g. due to loading data from a remote device), inadequate availability of the data due to network problems or equipment defects, etc., the availability aspect being of particular importance precisely in the area of cross-plant data, i.e. for company-wide access to the data.

Today the problems outlined above are only solved inadequately by distributing the configuration and runtime data to different automation devices and over various projects. As recipients of the data described here, each automation device and, in the case of control programs executed by an automation device, possibly also of a plurality of control programs, each automation device or control program, are also generically termed a client which simultaneously accesses configuration or runtime data of a plurality of devices or projects, therefore itself combines the data of the different devices and projects and is also responsible for the consistency of this data, e.g. in the event of configuration changes.

Against the background of the disadvantages outlined above, one object of the invention is to avoid these disadvantages as far as possible or at least reduce their effects.

This object is achieved according to the invention by an automation system as defined in the claims. For this purpose, in an automation system having a plurality of communicatively connected automation devices, it is provided that just one of the automation devices acts as a domain controller and that, for the automation system and the automation devices comprised thereby, this device holds centrally, in a memory, the data required for its/their operation.

It is preferably provided that, as data required for operating the automation system and the automation devices comprised thereby, the domain controller holds configuration and/or runtime data. The advantage of the invention and of this embodiment in particular is that the configuration and runtime data of the different devices, projects or systems is stored solely at a central location in the automation system, i.e. in the automation device here and hereinafter referred to as the domain controller. The domain controller is a defined device in the network comprised by the automation system for communicatively connecting the individual automation devices. Data required for operating the automation system and the automation devices comprised thereby, in particular runtime and configuration data, is stored solely on the domain controller. This also applies if the automation system is accessed using automation devices only temporarily connected thereto, such as e.g. development systems, i.e. a programming unit or the like, changed configuration or runtime data being transferred solely to the domain controller by such a development system. This reduces the storage requirement on all the other devices. Also reduced is the network load during the transition from a development phase to an operational phase of the automation system.

The domain controller performs an unlimited number of services which run independently of one another and administer a particular area of data in each case, in particular configuration or runtime data, e.g. data for user administration. This architecture ensures that the domain controller can be run not only on high-performance automation devices, e.g. personal or industrial computers, but also on devices with limited resources, i.e. operator panels or controls, for example. Ensuring the consistency of the data held by the domain controller is simplified by a central data administration and data repository (instead of the hitherto distributed administration and repository). This means that all the shared data is stored on the domain controller and only individual device-specific data, i.e. data which is only needed by a particular device and does not require synchronization, is stored on the automation devices themselves. Apart from this data, no configuration or runtime data is held on the automation devices comprised by the automation system or by control programs (clients) executed thereby.

Insofar as the invention also relates to a method for operating an automation system of the kind outlined above and described in further detail below, the object stated in the introduction is also achieved by the method defined in the claims. For this purpose it is provided in a method for operating an automation system of the kind described here that a transfer of configuration or runtime data from a development system to the domain controller includes a consistency check such that the relevant data is first transferred to the domain controller and the domain controller acknowledges to the development system that the transfer is successful, whereupon activation of the transferred data is initiated by the development system and the domain controller returns a status occurring during activation preparation to the development system, and finally the development system enables the transferred data for use depending on the returned activation preparation status. Such a transfer ensures the consistency of the data required for the automation system and the automation devices comprised thereby. The fact that transferred data is enabled before it can be used ensures that no data still in transfer, i.e. incomplete configuration or runtime data, for example, is used. Due to the fact that activation of transferred data is externally initiated and enabling is dependent on a resulting status, it is ensured that only properly transferred data can be used in the automation system for automation devices comprised thereby. When transferred data has been enabled, it is available centrally and once only in the automation system for access by other automation devices comprised by the automation system.

Advantageous embodiments of the invention are the subject matter of the dependent claims. Back-references used in the dependent claims relate to further refinements of the subject matter of the main claim by virtue of the features of the particular dependent claims; they are not to be understood as a waiver of the right to independent, objective protection for the combination of features of the dependent claims to which they refer. In addition, having regard to an interpretation of the claims in the case of a more detailed concretization of a feature in a subordinate claim, it is to be assumed that such a restriction does not exist in the respective preceding claims.

It is particularly preferably provided that, in connection with the transfer of new data, it is always ensured that data used hitherto which is replaced by the new data remains available and usable until transfer of the new data has been completed in such a way that it can be enabled. For this purpose it is provided that when transferring the relevant data to the domain controller, it is transferred to a free memory area of the domain controller without overwriting data already present on the domain controller, a memory area occupied by corresponding older data being marked as free for subsequent overwriting if the transferred data is enabled and, if no final enabling takes place in connection with the transfer, the memory area occupied by the transferred data being marked as free for subsequent overwriting.

To reduce the network load, it is provided according to a preferred embodiment that, when an automation device accesses data held by the domain controller, particularly configuration and/or runtime data, data requested during such an access is temporarily stored either on the part of the domain controller or on the part of the relevant automation device.

It is particularly preferably provided that an extent of temporary storage is automatically selected depending on a kind of access, on a type of accessing automation device and/or on a structure of the data accessed.

When, for temporarily storing the data accessed, the requesting or the supplying device (client or server), i.e. either the automation device or the domain controller, has automatically selected a suitable strategy for the relevant extent of temporary storage, it is particularly preferably provided that the data is temporarily stored both on the accessing automation device or by the accessing automation device and on or by the supplying domain controller, because in this way a kind of interaction of the storage strategies available for selection is possible.

The method described and explained in greater detail below is preferably implemented in software. Accordingly the invention also relates to a computer program for carrying out a method of this kind, comprising computer program instructions for implementing the individual steps or sequences of steps, a data medium with such a computer program and a computer system on which a computer program of this kind is loaded, i.e. an automation device, for example, which is provided for operation in an automation system of the kind described here, in particular a domain controller.

BRIEF DESCRIPTION OF THE DRAWINGS

An example of the invention will now be explained in greater detail with reference to the accompanying drawings. Objects or elements corresponding to one another are denoted by the same reference characters in all the figures.

The or each exemplary embodiment should not be interpreted as a limitation of the invention. On the contrary, within the scope of the present disclosure numerous changes and modifications are possible, especially such variants and combinations that, for example, as a result of combinations or modifications of individual features or elements or method steps contained in the general description, in the descriptions of various embodiments, and in the claims, and/or illustrated in the drawings, can be comprehended by persons skilled in the art as far as the achievement of the object is concerned and, as a result of combinable features, lead to a novel subject matter or to novel method steps and/or sequences of method steps.

In the drawings:

Figure 1:
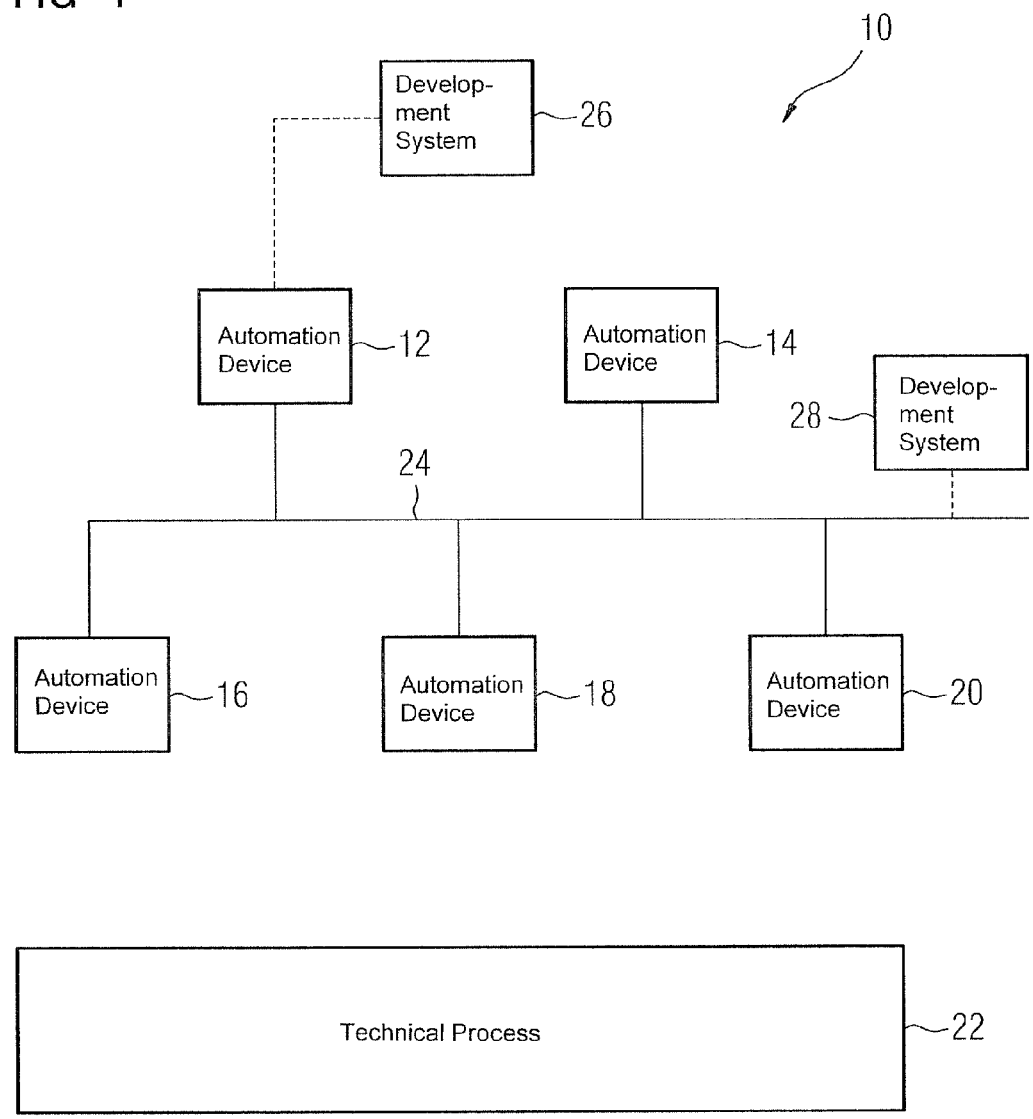
Figure 2:
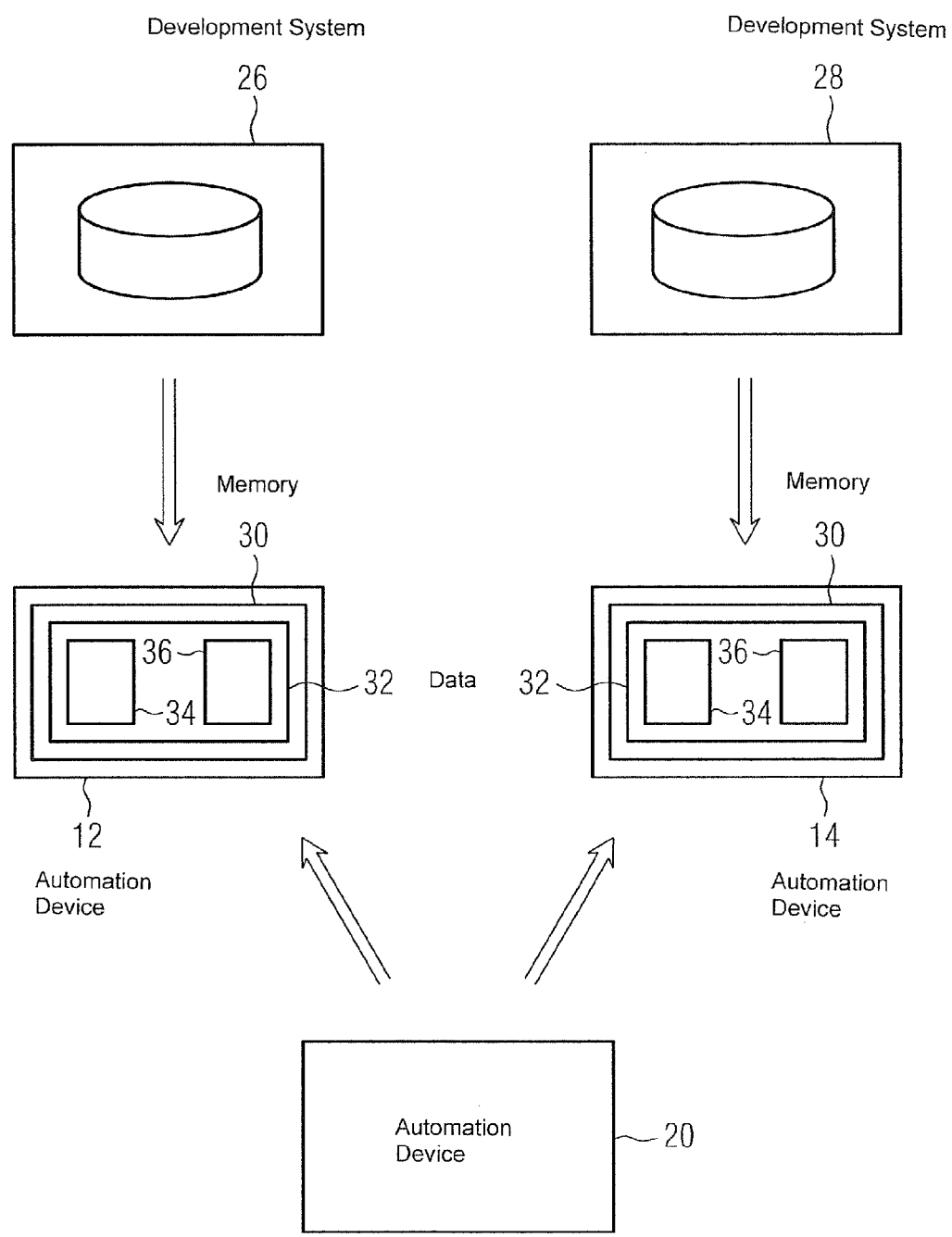
Figure 3:
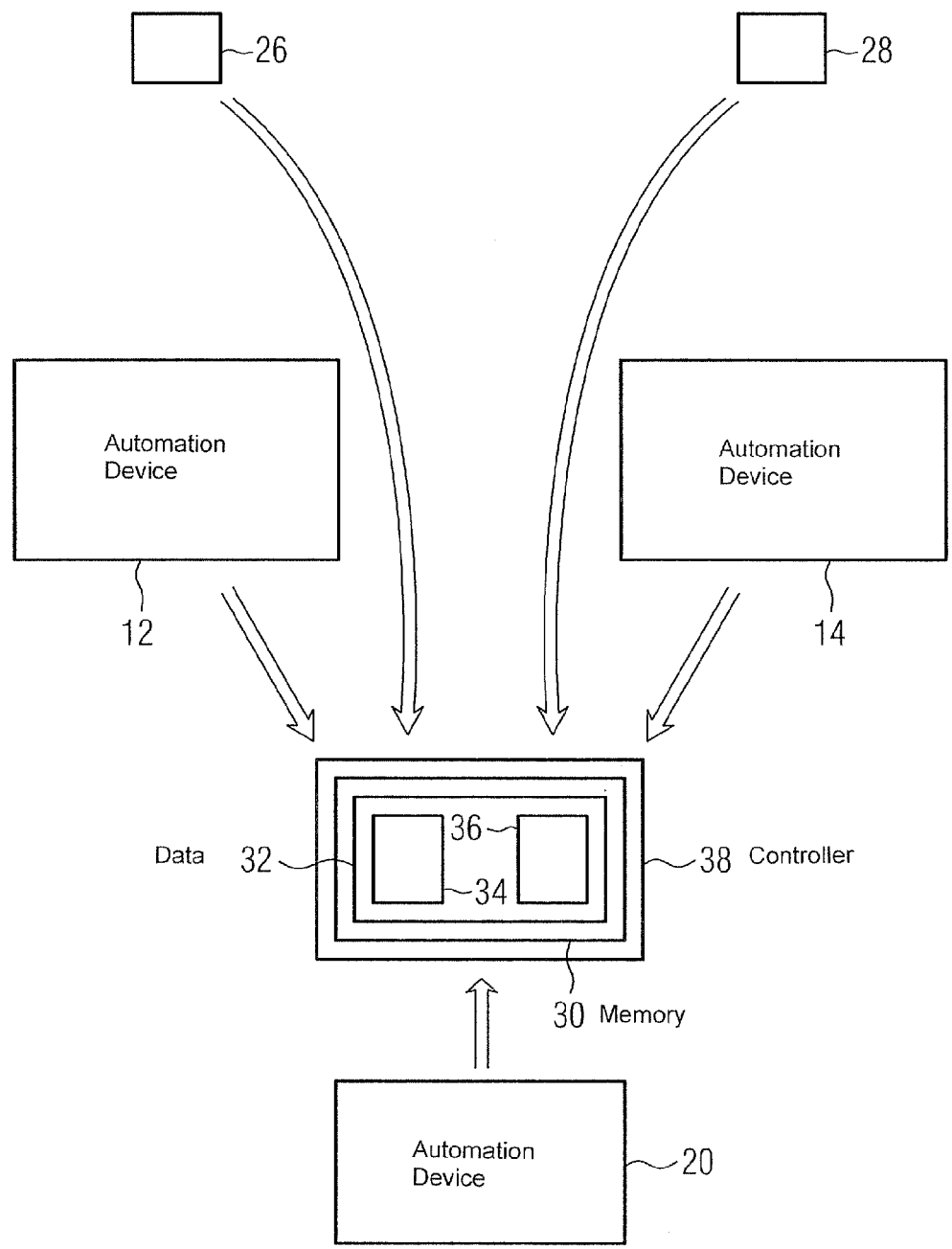
Figure 4:
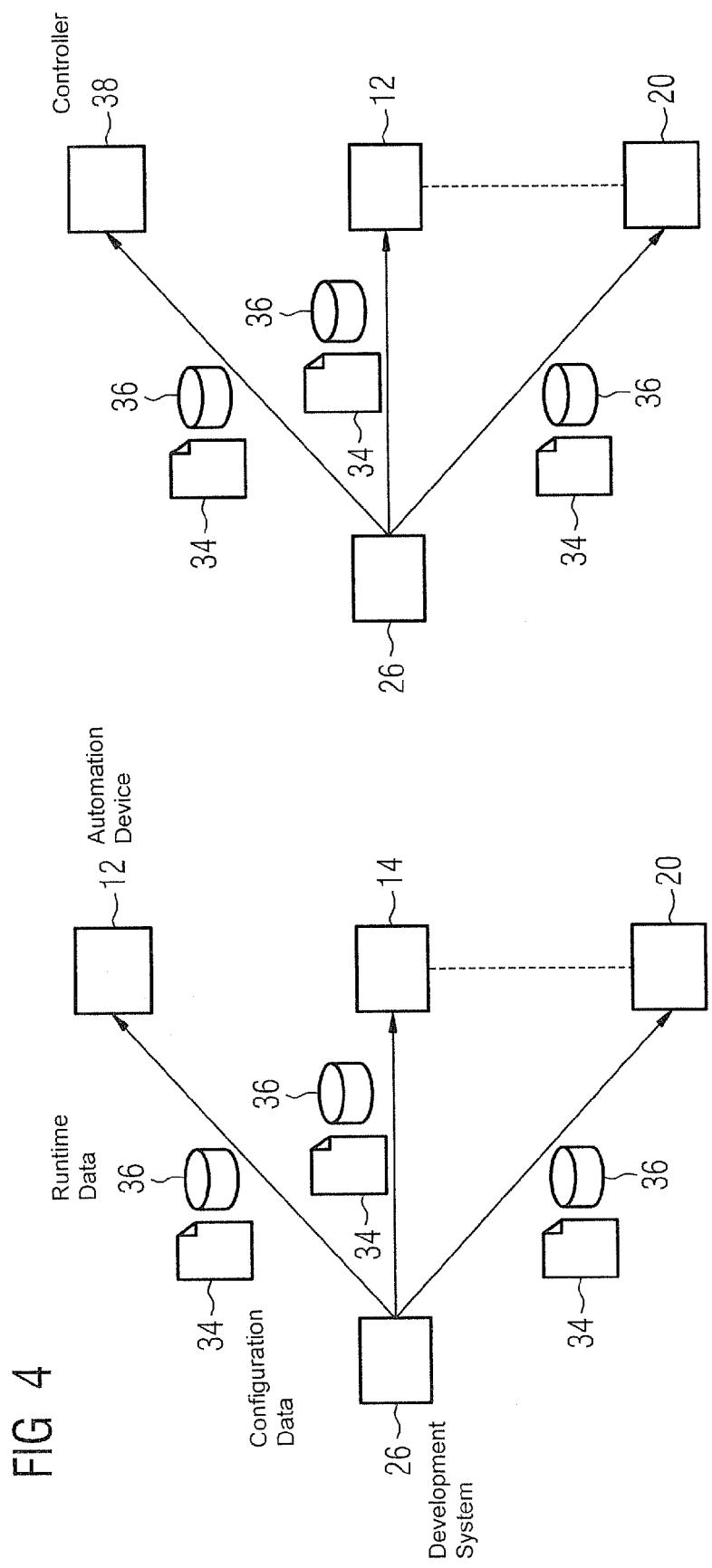
Figure 6:
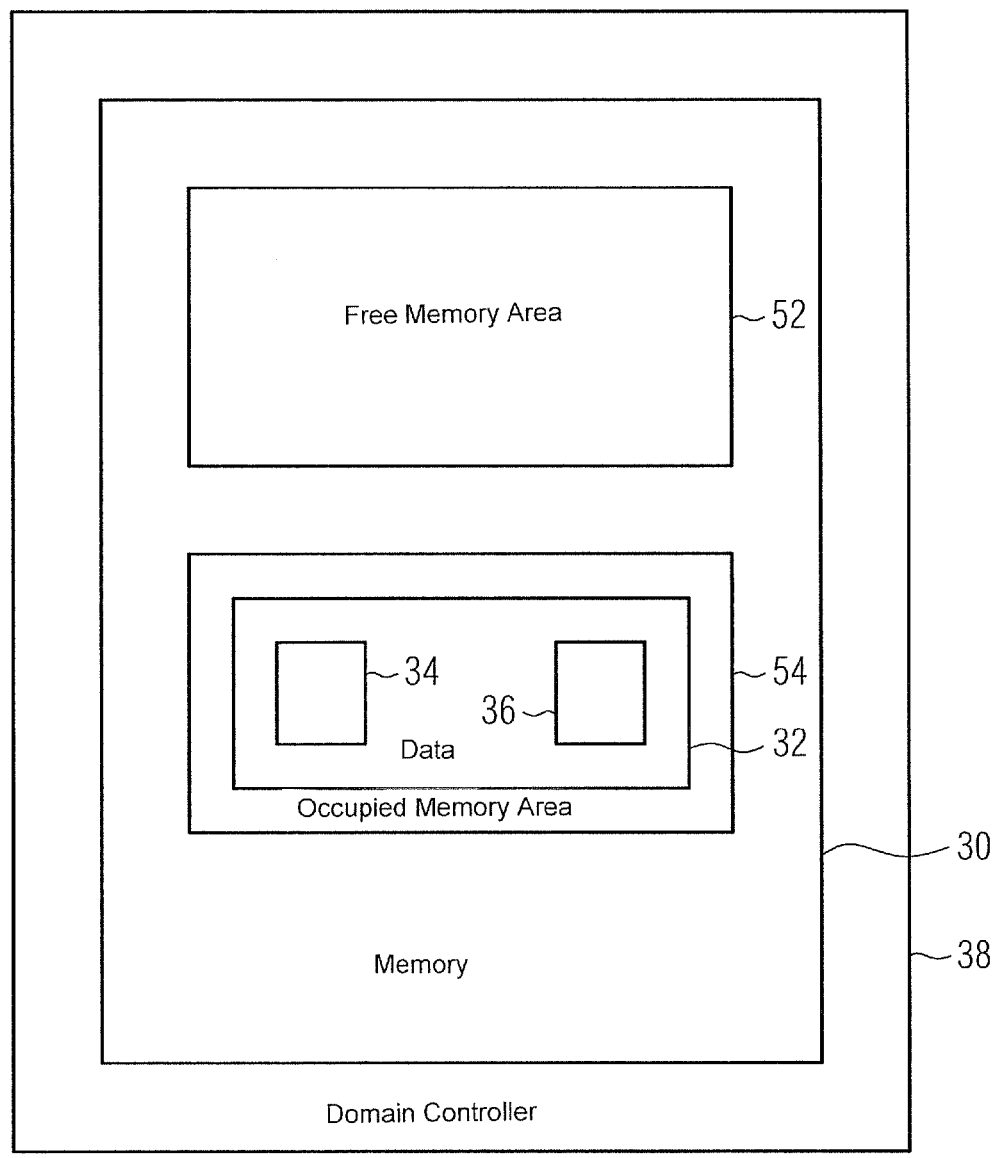

FIG. 1 shows an automation system with a plurality of communicatively connected automation devices, FIG. 2 shows another illustration of part of the automation system according to FIG. 1, FIG. 3 shows, in accordance with the illustration in FIG. 1, an automation system in the configuration proposed by the invention, with a domain controller for central data storage, FIG. 4 graphically illustrates the advantages associated with the invention, FIG. 5 shows in schematically simplified form an aspect of a method for operating the automation system and FIG. 6 shows a schematically simplified illustration of the domain controller.

DETAILED DESCRIPTION OF INVENTION

FIG. 1 shows in schematically simplified form an automation system, denoted as an entity by 10, having a plurality of communicatively connected automation devices 12, 14, 16, 18, 20. The automation system 10 or the thereby comprised automation devices 12-20 are designed in per se known manner for controlling and/or monitoring a technical process 22 (not shown in greater detail). For this purpose the automation system 10 exchanges with the technical process 22, in likewise per se known manner via sensors and actuators (not shown), process signals for recording e.g. status information in respect of the technical process 22 and control signals for influencing the technical process 22.

The communicative connection between the automation devices 12-20 is preferably via a bus 16, in particular a so-called field bus. Programming devices or the like serving as a development system 26, 28 can be connected to the automation system 10, e.g. by a connection to the bus 24, or to one of the automation devices 12-20.

FIG. 2 shows another illustration of parts of the automation system 10 according to FIG. 1. Shown here are a first and a second automation device 12, 14 which are designed e.g. for controlling individual independent or essentially independent sub-processes comprised by the technical process 22 (FIG. 1) and which accordingly can also be construed as a first and second system. In a memory 30, each system, i.e. each automation device 12, 14 or possibly also a combination of automation devices 12-20, holds data 32 for operating the relevant system. The data 32 includes, in particular, configuration and runtime data 34, 36. Such data 32 is input and maintained using a development system 26, 28.

For another automation device 20 requiring configuration and runtime data 34, 36 for its operation, access to a plurality of automation devices 12-20 may be required, i.e. access to the first and second automation device 12, 14 shown in FIG. 2, for example. This results in unnecessary data transfers in the automation system 10. Moreover, if parts of the data 32 are stored in a plurality of automation devices 12-20, unnecessary occupation of memory 30 occurs.

FIG. 3 shows basically the same illustration as in FIG. 2, but reduced to essential elements. According to the illustration in FIG. 3, local storage of data 32 provided for operating the automation devices 12-20 is omitted and, instead, storage of such data 32 is provided on a special automation device 12-20 hereinafter referred to as the domain controller 38 to differentiate it. In the memory 30 of the domain controller 38 is stored centrally for the automation system 10 and the automation devices comprised thereby 12-20 the data 32 required for its/their operation, particularly configuration and runtime data 34, 36. The data 32 is supplied centrally by each development system 26, 28 designed for creating or modifying such data 32. The data 32 can likewise be accessed centrally by each automation device 12-20 at the single domain controller 38 encompassed by the automation system 10. This avoids both multiple storage of the data 32 and unnecessary multiple data transfers. It also obviates the need to synchronize the data 32, which was still the case for a configuration of the type shown in FIG. 2.

FIG. 4 attempts to illustrate graphically the advantages associated with the invention. Shown on the left-hand side is the present situation in which configuration and/or runtime data 34, 36 for a plurality of automation devices 12-20 is created and maintained using a development system 26, 28, e.g. a programming unit, each automation device 12-20 holding locally in a memory assigned thereto the data required for its operation, i.e. in particular the configuration or runtime data 34, 36. Shown on the right-hand side is, in contrast, the approach according to the invention. The data required for the automation system 10 and the automation devices 12-20 comprised thereby, particularly configuration and runtime data 34, 36, is likewise created and maintained using the development system 26. The difference between this and the configuration shown on the left-hand side is that the data required for the automation system 10 as a whole and the automation devices 12-20 comprised thereby for its/their operation is stored centrally, namely in one domain controller 38 assigned to the automation system 10. In the other automation devices 12-20 comprised by the automation system 10, no more configuration and runtime data 34, 36 than is relevant solely for the particular automation device 12-20 is stored locally.

FIG. 5 shows in schematically simplified form an aspect of a method for operating the automation system 10 (FIG. 1), wherein to transfer e.g. configuration data 34 from a programming unit 26 to the domain controller 38, a successful transfer to the development system 26, 28 is acknowledged by the domain controller 38 by returning a confirmation signal 40. Thereupon, the development system 26, 28 initiates activation of the transferred data by forwarding an activation signal 42. The domain controller 38 then returns a status resulting from activation preparation to the development system 26, 28 in the form of a status signal 44. The initiation of activation of the transferred data includes, on the part of the domain controller 38, a complete check of the transferred data, i.e., for example, a plausibility check, a checksum test, etc. Only if all the tests provided indicate that the transferred data is error-free can a positive status signal 44 be returned to the development system 26, 28. Finally, depending on the returned activation preparation status, i.e. depending on the returned status signal 44, the development system 26, 28 enables the transferred data for use by transmitting an enable signal 46. Successful enabling can be confirmed by the domain controller 38 with an enable acknowledgment signal 48.

Concerning this aspect of the method, on the right-hand side in FIG. 5 a situation is shown in which e.g. an inconsistency of the configuration data 34 is ascertained, for which reason an error signal is returned by the domain controller as the status signal 44, whereupon the development system 26, 28 sends a delete request signal 50 to the domain controller 38, and finally the domain controller 38 discards the transferred data. Discarding of the data can be confirmed with an acknowledgment signal 48.

In respect of the method explained with reference to FIG. 5, FIG. 6 shows the design, provided for that purpose, of the domain controller 38. In its memory 30 are created at least two memory areas 52, 54 which for the sake of differentiation are referred to as free memory area 52 and occupied memory area 54. For the occupied memory area 54 it is assumed that, for the automation system 10 and the automation devices 12-20 comprised thereby, the data 32 required for its/their operation, particularly configuration and runtime data 34, 36, is stored centrally therein. In the first step of transferring data from a development system 26, 28 to the domain controller 38, this data is transferred to the free memory area 52 without overwriting data 32 already present on the domain controller 38, i.e. the data in the occupied memory area 54. In the event of enabling of the transferred data, a memory area 54 occupied by corresponding older data is flagged as free for subsequent overwriting. If no final enabling takes place in connection with the transfer of the data, the memory area occupied by the transferred data, i.e. the originally free memory area 52, is re-flagged as free for subsequent overwriting.

When an automation device 12-20 accesses the data 32 held by the domain controller 38, particularly configuration and/or runtime data 34, 36, data requested during such an access is temporarily stored and/or data presumably soon requested in consideration of the requested data is temporarily stored either on the part of the domain controller 38 or on the part of the particular automation device 12-20, an extent of temporary storage being automatically selectable depending on a kind of access, on a type of accessing automation device 12-20 and/or on a structure of the accessed data. A temporary storage strategy based on a kind of access, i.e. an access-specific temporary storage strategy, is based on the knowledge that different accesses to e.g. configuration or runtime data 34, 36 (such as displaying in lists, reading of individual data or writing of specific data) only require specific portions of the configuration or runtime data 34, 36. Consequently, the temporary storage mechanism loads the data in a function-specific manner, e.g. holds still more data blocks in the case of list functions or enumeration functions, while in the case of individual data accesses to properties of individual objects, the object as a whole is loaded into temporary storage. A device-specific temporary storage strategy is based on the fact that, because of the limitation of their respective resources, different devices 12-20 accessing the domain controller 38 can only access specific configuration or runtime data, so that the temporary storage mechanism only holds the configuration or runtime data 34, 36 matched to the corresponding device, i.e. only part of the total data. A structure-specific temporary storage strategy dependent on a structure of the accessed data is based on the fact that optimizations of the temporary storage mechanism are possible depending on the structure of the configuration or runtime data 34, 36. This means, for example, that in the case of "flat" configuration or runtime data 34, 36, the temporary storage loads structure data blocks whose size can be device-specific, while in the case of structured data from a technological hierarchy (e.g. objects such as pumping station, etc.), associated sub-structures (e.g. pumps) are also loaded up to a predefined or predefinable level, whereby such a depth of objects also loaded or also loadable can likewise again be device-specific. Such temporary storage can take place both on the part of the accessing automation device 12-20 and on the part of the domain controller 38. In order to find an optimum temporary storage strategy overall, it can be provided that all the temporary storage strategies described above interact. Further optimization is possible if on the part of the domain controller 38 likewise as "cache manager" a functionality for automatically selecting an extent of temporary storage can be implemented which supports the corresponding temporary storage strategies of the accessing device.

As further advantageous aspects for ensuring the consistency of the data 32 required for the automation system 10 and the automation devices 12-20 comprised thereby for its/their operation, there is provided a standardization of the object models between the different automation devices 12-20, a data format standardization which advantageously results in a reduction in the data volume. If required, the domain controller 38 can be made highly available through the use of a redundant device. In the case of a redundant domain controller 38, both controllers operate in so-called "hot standby mode", which means that there is an active domain controller 38 (master) and a passive domain controller 38 (slave). The active domain controller 38 synchronizes all changes to the data 32 with the passive domain controller 38. As the domain controller 38 assumes central management of the data 32, particularly of the configuration or runtime data 34, 36, it ensures the consistency of the data via an access layer. The data access layer encapsulates the data 32 from the actual services and provides methods for generating, reading, writing, modifying and deleting the data 32. The access layer automatically detects changes to the data 32 via its methods provided as an interface for accessing the data 32 and informs the temporary storages affected by the changes. The or each data storage affected in this respect adopts the changes and discards stored data depending on the temporary storage strategy selected. The consistency of the data 32 is ensured via the access layer and an identifier uniquely assigned for each development system 26, 28, i.e. each development system 26, 28 guarantees the consistency of the data 32 influenced thereby. Cross-system consistency is ensured by the above mentioned identifier. Services, properties and data 32 of the domain controller 38 are addressed in a multistage, i.e. fully qualifying manner, as the domain controller 38 must differentiate data 32 of different systems (cf. description for FIG. 2) and projects. For the addressing it is therefore necessary that the identifier is uniquely assigned.

The following advantages flow from the approach according to the invention: the domain controller 38 centrally administers shared data 32, such as in particular configuration and runtime data 34, 36, of devices, projects and systems (on a plant-wide or company-wide basis). Multiple duplication and loading of the data 32 to the each device is eliminated. The foremost central technical aspects here are, firstly, a structured (optimized) storage of the data 32 on the domain controller 38 for efficient and high-performance access, then uniform cross-system management and addressing of the data 32, enabling transparent access thereto (across projects or systems), and, finally, increased availability of the automation system 10 or devices 12-20 comprised thereby by significantly reducing the volume of data to be transported. Plant- or company-wide centralization of the data 32 on the domain controller 38 makes it possible to combine data 32 hitherto multiply stored in the automation system 10 (also overlapping data 32) for transfer to the domain controller 38, thereby reducing the storage requirement in the automation system. An access layer with internal temporary storage ensures the required response times and the necessary data throughput. On the part of the domain controller 38, the access layer additionally ensures the consistency of the data 32.

From the point of view of a device 12-20 accessing the data 32, the domain controller 38 provides the following advantages: fast, location-transparent access; consistency of the data 32 is ensured by services of the domain controller 38, the temporary storage mechanism as well as a uniform access layer; no data such as configuration or runtime data needs to be held on the accessing device, apart from data relevant for that device only, and any temporary storage content.

To summarize, the present invention can therefore be briefly described as follows: there is specified an automation system 10 having a plurality of communicatively connected automation devices 12-20, only one of which operates as a domain controller 38 and which holds centrally, in a memory 30, for the automation system 10 and the automation devices 12-20 comprised thereby, data 32 required for its/their operation, so that hitherto frequently occurring multiple storage of such data 32 is eliminated, the data 32 is centrally available for access by all the automation devices 12-20 and the domain controller 38 as the central data server ensures consistency of the data 32 administered and provided by it, which also permits access optimizations such as e.g. device-, access- or structure-dependent temporary storage strategies.

The invention claimed is:

1. An automation system, comprising
a plurality of communicatively connected automation devices,
wherein one of the automation devices serves as a domain controller, wherein the domain controller comprises a memory that holds centrally in the memory data required for operating the automation system and the automation devices, said data comprising configuration and runtime data to be shared by the automation devices, wherein the memory in the domain controller is divided into two memory areas;
wherein the domain controller is configured such that a transfer data from a development system to the memory of the domain controller is first transferred to a memory area flagged as a free memory area without overwriting a memory area designated as an occupied memory area having data already present therein;
wherein the domain controller is configured to implement a check of the transferred data to ensure consistency such that any inconsistency of the transferred data results in an error signal and the transferred data is discarded from the free memory area and the free memory area remains flagged as the free memory area, otherwise consistency is ensured, the data is enabled, and the free memory area containing the transferred data is now flagged as the occupied memory area and the previously occupied memory area is now flagged as the free memory area for subsequent overwriting; and
wherein the domain controller is configured to centrally administer the data to be shared by the automation devices after ensuring consistency, wherein access by the automation devices is via an access layer that allows access to the data held by the domain controller in the occupied memory area.

2. A method for operating an automation system having a plurality of communicatively connected automation devices, wherein one of the automation devices serves as a domain controller and holds centrally in a memory data required for operating the automation system and the automation devices, said data comprising configuration and runtime data to be shared by the automation devices, wherein the memory in the domain controller is divided into two memory areas, the method comprising:
transferring data from a development system to the memory of the domain controller first to a memory area flagged as a free memory area without overwriting a memory area designated as an occupied memory area;
acknowledging receipt by the domain controller to the development system that the transfer is complete;
receiving by the domain controller an activation signal for the transferred data from the development system;
implementing by the domain controller a check of the transferred data to ensure consistency;
returning a status signal by the domain controller to the development system resulting from the check wherein:
  (1) when the check determines an inconsistency of the transferred data, the status signal returned is an error signal, the transferred data is discarded from the free memory area, and the free memory area remains flagged as the free memory area; otherwise,
  (ii) the check determines consistency of the transferred data, the status signal returned is a positive signal, the data is enabled, and the free memory area containing the transferred data is now flagged as the occupied memory area and the previously occupied memory area is now flagged as the free memory area for subsequent overwriting; and
centrally administering the data shared by the automation devices after ensuring consistency, wherein access by the automation devices is via an access layer that allows access to the data held by the domain controller in the occupied memory.

3. The method as claimed in claim 2, wherein when data held on the domain controller are accessed by an automation device, the data are temporarily stored either on the part of the domain controller or on the part of the automation device.

4. The method as claimed in claim 3, wherein an extent of temporary storage is automatically selected depending on a kind of access, on a type of the respective accessing automation device and/or on a structure of the data accessed.

5. The method as claimed in claim 3, wherein the temporary storage takes place both on the accessing automation device and on the domain controller.

6. A non-transitory computer readable medium storing a computer program for, when executed on a computer system, carrying out a method for operating an automation system having a plurality of communicatively connected automation devices, wherein one of the automation devices serves as a domain controller and holds centrally in a memory data required for operating the automation system and the automation devices, said data comprising configuration and runtime data to be shared by the automation devices, wherein the memory in the domain controller is divided into two memory areas, the method comprising:
transferring data from a development system to the memory of the domain controller first to a memory area flagged as a free memory area without overwriting a memory area designated as an occupied memory area;
acknowledging receipt by the domain controller to the development system that the transfer is complete;
receiving by the domain controller an activation signal for the transferred data from the development system;
implementing by the domain controller a check of the transferred data to ensure consistency;
returning a status signal by the domain controller to the development system resulting from the check; wherein:

(i) when the check determines an inconsistency of the transferred data, the status signal returned is an error signal, the transferred data is discarded from the free memory area, and the free memory area remains flagged as the free memory area; otherwise,
(ii) the check determines consistency of the transferred data, the status signal returned is a positive signal, the data is enabled, and the free memory area containing the transferred data is now flagged as the occupied memory area and the previously occupied memory area is now flagged as the free memory area for subsequent overwriting; and centrally administering the data shared by the automation devices after ensuring consistency, wherein access by the automation devices is via an access layer that allows access to the data held by the domain controller in the occupied memory.

7. The non-transitory computer readable medium as claimed in claim 6, wherein, when data held on the domain controller are accessed by an automation device, the data are temporarily stored either on the domain controller or on the automation device.

8. The non-transitory computer readable medium as claimed in claim 7, wherein an extent of temporary storage is automatically selected depending on a kind of access, on a type of the respective accessing automation device and/or on a structure of the data accessed.

9. The non-transitory computer readable medium as claimed in claim 7, wherein the temporary storage takes place both on the accessing automation device and on the domain controller.

* * * * *